United States Patent
Kumagami et al.

(10) Patent No.: US 6,724,695 B2
(45) Date of Patent: Apr. 20, 2004

(54) METHOD FOR ACCESSING OPTICAL DISK BY DETECTING THE DIFFERENT BETWEEN MOVING COMMAND AND ACTUALLY MOVING

(75) Inventors: Yusuke Kumagami, Iwaki (JP); Hiromichi Yamamoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 303 days.

(21) Appl. No.: 09/903,233

(22) Filed: Jul. 11, 2001

(65) Prior Publication Data

US 2002/0018405 A1 Feb. 14, 2002

(30) Foreign Application Priority Data

Jul. 19, 2000 (JP) ........................................ 2000-219314

(51) Int. Cl.[7] .............................................. G11B 21/08
(52) U.S. Cl. .................................. 369/30.17; 369/30.11
(58) Field of Search ............................. 369/30.17, 30.1, 369/30.11, 30.12, 30.13, 30.14, 44.28, 44.27; 360/77.04, 78.06, 78.07

(56) References Cited

U.S. PATENT DOCUMENTS

| | | | | |
|---|---|---|---|---|
| 5,010,425 A | * | 4/1991 | Asai | 360/78.04 |
| 5,195,067 A | * | 3/1993 | Yanagi | 369/30.17 |
| 5,208,710 A | * | 5/1993 | Uno | 360/78.01 |
| 5,345,348 A | * | 9/1994 | Suzuki | 360/78.07 |
| 5,371,724 A | * | 12/1994 | Uno | 360/78.14 |
| 5,808,982 A | | 9/1998 | Yun | 369/44.28 |
| 6,118,616 A | | 9/2000 | Jeong | 360/78.07 |

FOREIGN PATENT DOCUMENTS

JP 5-12692 A * 1/1993 ............... 369/30.17

* cited by examiner

Primary Examiner—Tan Dinh
(74) Attorney, Agent, or Firm—Brinks Hofer Gilson & Lione

(57) ABSTRACT

A disc playback apparatus incorporating a memory that stores data concerning errors or differences between commanded number of tracks to be traversed and the number of tracks actually traversed by an optical pickup actuated by a servo controller. The apparatus further includes a traversed track number computing unit computes the number of tracks to be traversed by the optical pickup when the optical pickup is moved to a track that corresponds to the address where the data to be read is stored and a correction processing unit performs a predetermined correction processing on the computed number of tracks to be traversed, taking into consideration the error data stored in the memory.

24 Claims, 6 Drawing Sheets

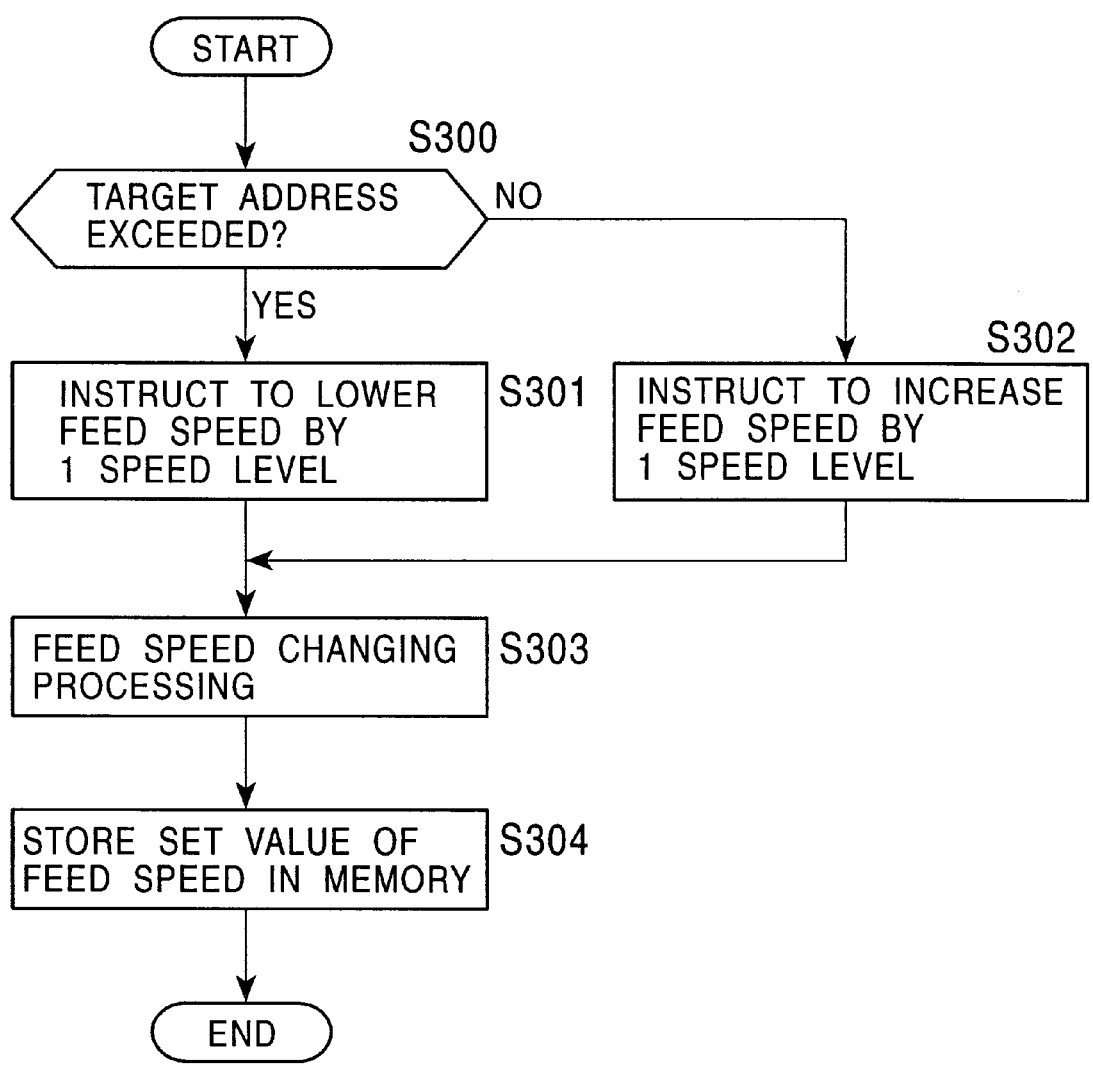

METHOD FOR ACCESSING OPTICAL DISK BY DETECTING THE DIFFERENT BETWEEN MOVING COMMAND AND ACTUALLY MOVING

BACKGROUND OF THE INVENTION

1. Field of the Invention

The present invention relates to a disc playback apparatus. The disc playback apparatus may be used in a personal computer, an audio system, or a navigation system, which reads data from a rotating disc storage medium.

2. Description of the Related Art

Optical discs are prevalent as readable storage media. The CD (Compact Disc), DVD (Digital Versatile Disc), and MD (Mini-Disc) are all examples of optical discs.

An optical disc has one or two signal recording surfaces on one side thereof. Each signal recording surface has holes referred to as "pits". There are several different lengths of pits. Pits of the different lengths are arrayed in combination in the longitudinal direction to form a track. In order to read data recorded in the disc, a computation is executed to determine the number of the tracks between the track corresponding to the instant position of an optical pickup and the track corresponding to an address storing the target data (this address will be referred to as "target address," hereinafter). The optical pickup is moved in the radial direction of the disc across the tracks, while the number of the traversed tracks is counted, whereby the reading position of the optical pickup approaches the target address.

In recent years, there is a demand for shortening the time required for each seeking operation, i.e., an operation for moving the optical pickup reading position towards a target position, in order to achieve higher data reading speed. A conventional disc playback apparatus, however, produces a large error or difference between the target address and the address reached by the optical pickup in a single seeking cycle. Consequently, the seeking operation has to be repeated many times until the target address is reached, thus increasing the seeking time.

The seeking error, i.e. the difference between the reached address and the target address, is attributable to various factors. For instance, the error may be caused by variation in the precision of position control of the optical pickup, variation in the environment around the location where the disc playback apparatus is situated, change in the characteristics due to aging, error in the servo system that controls the radial traveling of the optical pickup, and so forth. These factors and, hence, the magnitude of the error vary according to the individual elements of the disc playback apparatus. Therefore, it has been difficult to apply a common countermeasure to all elements of the disc playback apparatus.

Increasing the optical pickup travel speed to shorten the seeking time also may lead to unstable seeking operation, because the variation in the factors according to the individual elements may cause a large deviation or error of the reached address from the target address. Further, however, it is not a common practice to make adjustments for each of the types of optical discs that may be used with the disc playback apparatus. Rather, a general adjustment, aiming at achieving a predetermined fixed optical pickup traveling speed is commonly preferred. In other words, it has been difficult to optimize the optical pickup traveling speed for each of the types of optical discs. This also makes it more difficult to shorten the seeking time.

SUMMARY

Accordingly, it is an object of the present invention to provide a disc playback apparatus that shortens the seeking time while avoiding influence of variations of the elements of the playback apparatus.

In one embodiment of the present invention, a disc playback apparatus has an optical pickup, an optical pickup moving, a travel amount commanding means, travel amount error detecting means, and a travel amount correcting means. The optical pickup reads information stored in an optical disc. The optical pickup moving means causes the optical pickup to travel in a radial direction of the disc. The travel amount commanding means gives optical pickup travel amount command to the optical pickup moving means. The error detecting means detects a travel amount error in terms of the difference between the travel amount command formed by the travel amount commanding means and the amount actually traveled by the optical pickup by the operation of the optical pickup moving means. The travel amount correcting means corrects the value of the travel amount command so as to reduce the travel amount error. The travel amount command given to the optical pickup moving means to execute the seeking operation is determined in consideration of an error which is expected to occur upon actual traveling of the optical pickup. This permits the optical pickup to be efficiently moved to the position where the information to be read is stored, thus shortening the seeking time. The travel amount command is corrected based on the actual amount of error detected on each individual disc playback apparatus, so that each disc playback apparatus is enabled to perform the seeking operation with high accuracy, while compensating for variations in the individual apparatuses.

Preferably, the disc playback apparatus further has an error data storage means for storing the values of the travel amount error detected by the error detecting means, in relation to values of the travel amount command which are set at a predetermined pitch. This feature serves to reduce the size of the data to be stored in the error data storage means. In the error data storage means, the detected travel amount error values for each of the travel amount command values are stored and the travel amount values are set at a predetermined interval.

In particular, it is preferred that the error data storage means comprises a non-volatile memory. Use of a non-volatile memory such as EPROM permits the detected travel amount error data to be preserved even after the power to the disc playback apparatus is turned off. When the power is turned on again, correction of the travel amount command can be performed with a high degree of precision, by using the travel amount error data that had been accumulated before the power is turned off.

Preferably, the arrangement is such that the error data storage means stores the travel amount error in association with the direction of travel of the optical pickup caused by the optical pickup moving means, and that the travel amount correcting means performs the correction based on both the direction of travel and the travel amount error. The travel amount error produced when the optical pickup is being moved radially outward of the disc-type storage medium may differ from that produced when the optical pickup is being moved radially inward of the same, depending on the mechanical structure of the optical pickup moving means for causing the optical pickup to travel. When such a difference exists, the seeking precision can be enhanced to shorten the seeking time, by effecting the correction of the travel amount command while taking the direction of movement of the optical pickup into consideration.

The disc-type storage medium may have a plurality of layers providing signal recording surfaces. In such a case, the error data storage means is preferably arranged to store the travel amount error in association with the position of the layer of a signal recording surface, and the travel amount correcting means performs the correction based on both the position of the layer and the travel amount error. When a disc-type recording medium having a plurality of layers presenting signal recording surfaces is used, the travel amount error may have dependency on the position of the layer, because the intensity of the optical signal sensed by the optical pickup varies according to the position of the layer. In such a case, a further improvement in the seeking precision can be achieved by correcting the travel amount taking into account also the position of the layer which provides the signal recording surface carrying the signals to be read, thus contributing to the shortening of the seeking time.

Preferably, the apparatus further has an error data updating means for successively updating, in parallel with the operation for reproducing information read through the optical pickup, the content of the error data storage means based on the results of the detection performed by the error detecting means. The updating of the travel amount data error, which is performed in parallel with the ordinary reproducing operation, permits highly reliable correction of the travel amount command.

It is also preferred that the travel speed setting means which, when the travel amount error detected by the error detecting means exceeds a predetermined value, sets the travel speed of the optical pickup to a high speed if the position of the optical pickup after a travel is still short of a reading position corresponding to the travel amount command, and sets the travel speed to a low speed if the position of the optical pickup has overreached the reading position. By adjusting the travel speed of the optical pickup when the travel amount error is large, it is possible to avoid unstable seeking operation, thus contributing to shortening of the seeking time.

In accordance with another embodiment of the present invention, there is provided a disc playback apparatus comprising an optical pickup for optically reading information stored in an optical disc, an optical pickup moving means for causing the optical pickup to travel in a radial direction of the disc, a travel amount commanding means for giving optical pickup travel amount command to the optical pickup moving means, an error detecting means for detecting a travel amount error in terms of the difference between the travel amount command as the travel amount commanded by the travel amount commanding means and the amount actually traveled by the optical pickup by the operation of the optical pickup moving means, and a travel speed setting means which, when the travel amount error detected by the error detecting means exceeds a predetermined value, sets the travel speed of the optical pickup to a high speed if the position of the optical pickup after a travel is still short of a reading position corresponding to the travel amount command and to a low speed if the position of the optical pickup has overreached the reading position.

The tendency for the seeking operation becoming unstable is suppressed also by adjusting the traveling speed instead of the value of the travel amount command, thus achieving shortening of the seeking time.

In accordance with still another embodiment of the present invention, there is provided a seeking method for a disc playback apparatus having an optical pickup for optically reading information stored in an optical disc. The method comprises the acts of computing a travel amount command which commands the amount to be traveled by the optical pickup in a radial direction of the disc, detecting a travel amount error in terms of the difference between the travel amount command and the amount actually traveled by the optical pickup in accordance with the travel amount command, and correcting the value of the travel amount command so as to reduce the travel amount error.

In accordance with a further embodiment of the present invention, there is provided a seeking method for a disc playback apparatus having an optical pickup for optically reading information stored in an optical disc. The method comprises the acts of computing a travel amount command which commands the amount to be traveled by the optical pickup in a radial direction of the disc detecting a travel amount error in terms of the difference between the travel amount command and the amount actually traveled by the optical pickup in accordance with the travel amount command, storing the detected travel amount error in a memory, correcting the value of the travel amount command so as to reduce the travel amount error, and successively updating the content of the memory based on the results of the detection of the travel amount errors performed in every seeking operations.

In accordance with a still further embodiment of the present invention, there is provided a seeking method for a disc playback apparatus having an optical pickup for optically reading information stored in an optical disc. The method comprises the acts of commanding an amount to be traveled by the optical pickup in a radial direction of the disc, detecting a travel amount error in terms of the difference between the travel amount command and the amount actually traveled by the optical pickup in accordance with the travel amount command, and setting, when the travel amount error exceeds a predetermined value, the travel speed of the optical pickup to a high speed if the position of the optical pickup after a travel is still short of a reading position corresponding to the travel amount command, and to a low speed if the position of the optical pickup has overreached the reading position.

The above and other objects, features and advantages of the present invention will become clear from the following description of the preferred embodiments taken in conjunction with the accompanying drawings.

BRIEF DESCRIPTION OF THE DRAWINGS

FIG. 7 is a flowchart showing the process of changing the feed speed in one embodiment of the present invention.

DETAILED DESCRIPTION OF THE INVENTION

An embodiment of the disc payback apparatus incorporating the present invention will be described with reference to the accompanying drawings.

Figure 1:
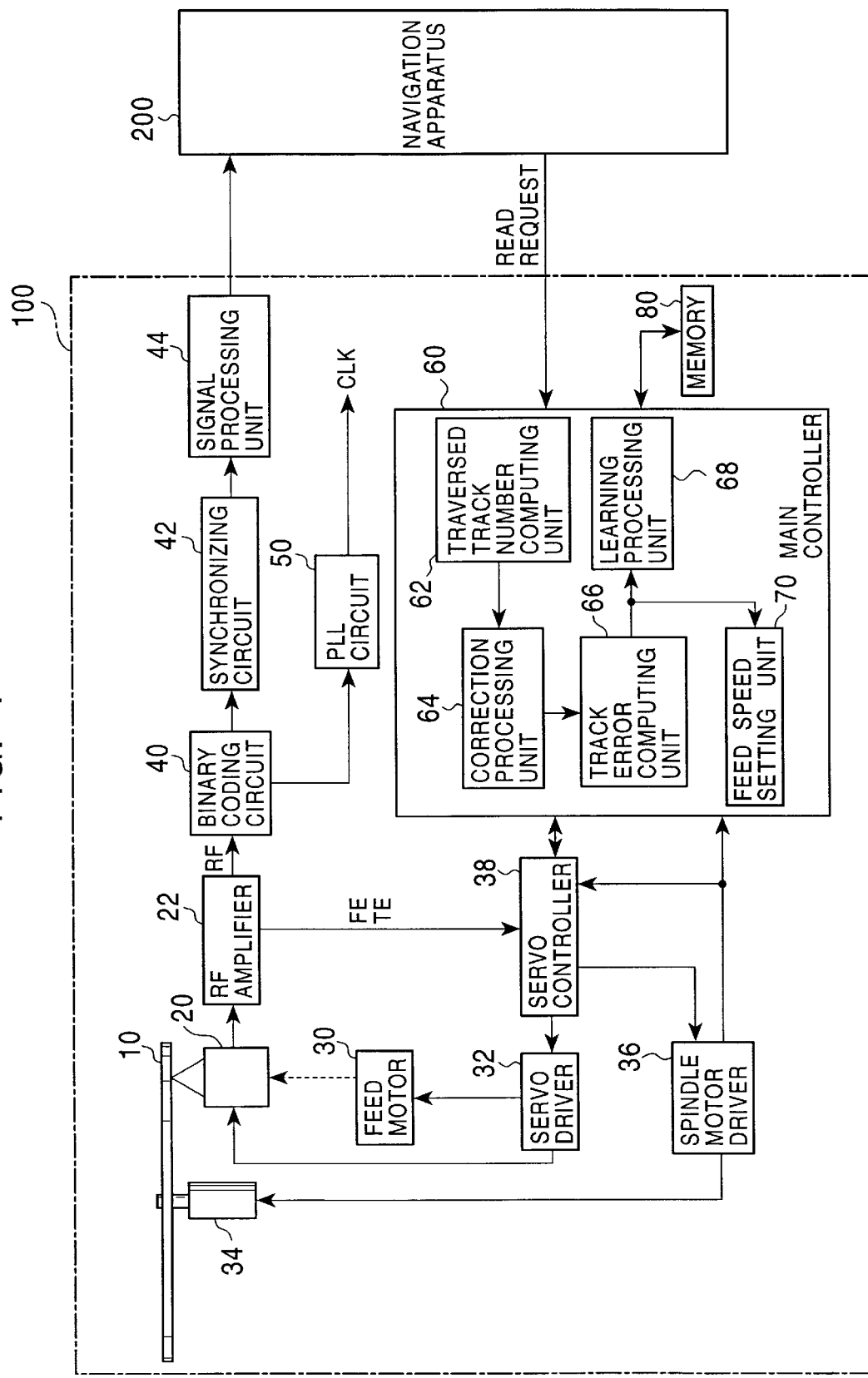
FIG. 1 is a diagram showing the configuration of a disc playback apparatus in accordance with one embodiment of the present invention.

FIG. 1 is a diagram showing an embodiment of the disc playback apparatus of the present invention. For instance, a disc apparatus 100 is configured to perform a processing in response to a read request from a navigation apparatus 200 operable to read map data recorded in a disc 10.

As shown in FIG. 1, the disc playback apparatus 100 includes an optical pickup 20, an RF amplifier 22, a feed motor 30, a servo driver 32, a spindle motor 34, a spindle motor driver 36, a servo controller 38, a binary coding circuit 540, a synchronizing circuit 42, a signal processing unit 44, a PLL circuit 50, a main controller 60, and a memory 80.

The optical pickup 20 reads signals recorded in the disc 10. The optical pickup 20 includes the following components: an objective lens for condensing light rays from a semiconductor laser and for directing light rays reflected from a signal recording surface of the disc 10 to a photodiode; a focusing actuator that adjusts the objective lens in directions perpendicular to the signal recording surface of the disc 10 thereby performing focus control; and a tracking actuator for performing the tracking control by moving the objective lens 10 in radial a radial direction of the disc 10.

The RF amplifier 22 amplifies the signals output from the optical pickup 20 and performs a predetermined equalizing processing on the amplified signals, thereby generating and outputting RF signals. The RF amplifier 22 also serves to generate a focus error signal (FE) which is used in the focus servo control and a tracking error signal (TE) which is used in the tracking servo control. The RF amplifier also produces a detection pulse signal each time a track is traversed by the optical pickup 20 during seeking operation.

The feed motor 30 causes the optical pickup 20 to travel in the radial direction of the disc 10, whereby a predetermined seeking operation is performed. The servo driver 32 drives the feed motor 30 and the focus actuator incorporated in the optical pickup 20. The spindle motor 34 drives the disc 10 so that the disc rotates at a predetermined speed. The spindle motor driver 36 drives the spindle motor 34.

The servo controller 38 performs various kinds of servo control in accordance with instructions given by the main controller 60. For instance, the servo controller 38 sends instructions to the servo driver 32, thereby implementing focus servo control and tracking servo control, while controlling the speed of rotation of the spindle motor 34 by giving instructions to the spindle motor driver 36. This embodiment employs a CAV control system that maintains a constant rotation speed of the spindle motor irrespective of the radial position of the optical pickup 20.

The binary coding circuit 40 compares the level of the RF signal received from the RF amplifier 22 with a predetermined voltage level, thereby converting the RF signal level into a binary code. In general, the disc 10 has pits of different lengths arranged along each track. By converting the RF signal into a binary code, it is possible to obtain pulse signals having pulse widths corresponding to the lengths of the consecutive pits arranged along the track.

The synchronizing circuit 42 performs sampling of the signals derived from the binary coding circuit 40 by using an internal clock signal CLK, thereby generating data synchronous with the internal clock signal CLK. The internal clock signal CLK is generated by the PLL circuit 50, based on the signal produced by the binary coding circuit 40.

The signal processing unit 44 performs various kinds of signal processing on the data produced by the synchronizing circuit 42. Specifically, the binary coding circuit 40 produces EFM (Eight to Fourteen Modulation) signals, and the signal processing unit 44 performs error correction processing and FEM demodulation, followed by a CIRC (Cross Interleaved Read-Solomon Code) decoding processing.

The PLL circuit 50 includes a phase comparator, a low-pass filter and a voltage control oscillator which are connected in the form of a loop. The PLL circuit 50 generates the internal clock signal CLK based on the signals derived from the binary coding circuit 40, and delivers the internal clock signal CLK to the synchronizing circuit 42, signal processing circuit 44, and to other circuits requiring a clock signal.

The main controller 60 is responsible for the overall control of the disc playback apparatus 100, including delivery of various kinds of servo instructions to the servo controller 38. The main controller 60 includes a traversed track number computing unit 62, a correction processing unit 64, a track error computing circuit 66, a learning processing unit 68, and a feed speed setting unit 70.

The traversed track number computing unit 62 computes the number of tracks that are to be traversed by the optical pickup 20. This number of tracks indicates the amount to be traveled by the optical pickup 20 from an instant position to a target address. Specifically, each address position is expressed in terms of "absolute track number" which is the serial number of each track as counted from a predetermined zero-address position. The traversed track number computing unit 62 computes the absolute track number Ti of the instant position of the optical pickup 20, as well as the absolute track number Tt of the target address, and determines the number of the tracks to be traversed as the difference between these two absolute track numbers.

In general, a disc-type storage medium such as a CD or a DVD records data starting from the inner peripheral end of the disc towards the outer periphery of the same. Thus, radially outer tracks have greater absolute track numbers. Therefore when the absolute track number Tt is greater than the absolute track number Ti (Ti<Tt), the optical pickup 20 moves radially outward, and the number of tracks to be traversed is determined by subtracting the absolute track number Ti from the absolute track number Tt. When the absolute track number Tt is smaller than the absolute track number Ti (Ti>Tt), the optical pickup 20 is to be moved radially inward, and the number of tracks to be traversed is determined by subtracting the absolute track number Tt from the absolute track number Ti.

The correction processing unit 64 performs correction processing on the number of the tracks to be traversed as computed by the traversed track number computing circuit 62. The number of tracks to be traversed after correction processing serves as a command value in the seeking instructions given to the servo controller 38 from the main controller 60. The value of the corrected number of tracks to be traversed will be referred to as "command number of traversed tracks", hereinafter. The detail of the correction processing performed by the correction processing unit 64 is described below.

When the optical pickup 20 has traveled to a position near the target address as a result of the seeking operation, the track error computing unit 66 detects the address of the position actually reached by the optical pickup 20 and computes the absolute track number Tr corresponding to this position. The track error computing unit 66 then determines the number of the tracks actually traversed by the optical pickup 20, and computes the difference between this absolute track number and the above-mentioned command number of traversed tracks. In the description of the illustrated embodiment, the term "track error" is used to mean the difference between the number of tracks actually traversed by the optical pickup and the command number of traversed tracks. For example, if the command number of traversed tracks is set to 20000 for the optical pickup 20 moving radially outward and the number of the tracks actually traversed is 20800, the track error is +800 (tracks).

Figure 2:
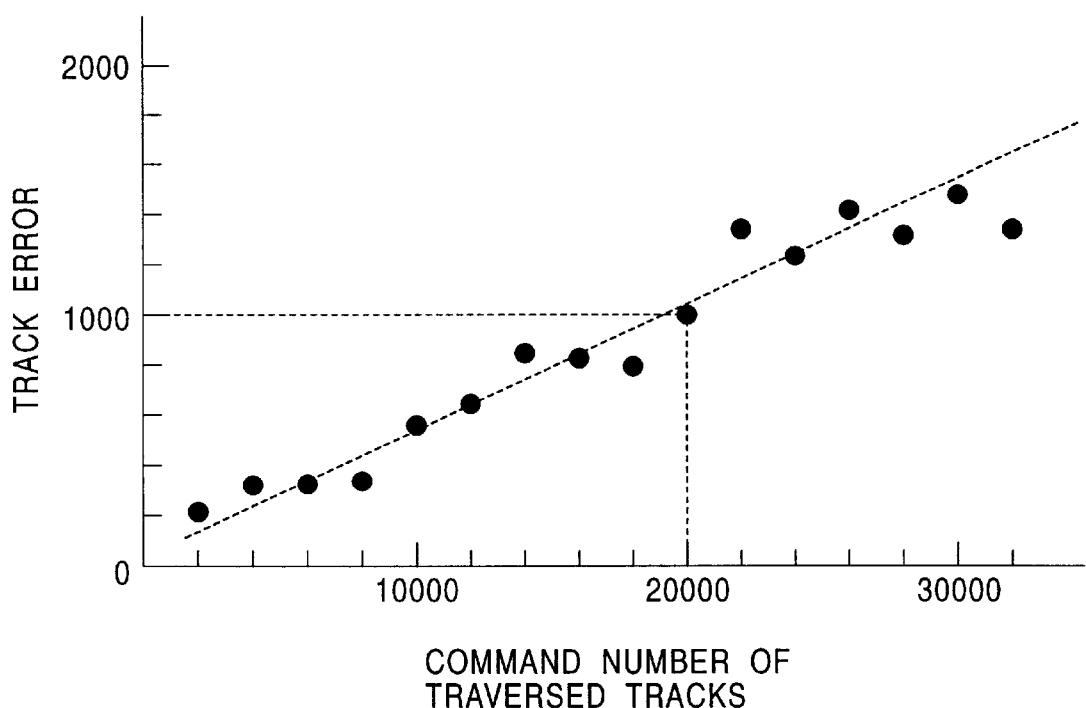
FIG. 2 is a chart showing the relationship between a command number of traversed track and a track error.

FIG. 2 is a chart illustrating the relationship between the command number of traversed tracks and the track error. The track error increases substantially in proportion to an increase in the command number of traversed tracks. For instance, the track error is about 1000 tracks when the command number of traversed tracks is 20000. This indicates that, when a predetermined seeking operation is performed under the traversed track number command of 20000, the optical pickup 20 actually travels across 21000 tracks. In other words, when the target number of the tracks to be traversed (number of tracks as computed by the traversed track number computing unit 62) is set to 2000 tracks, the optical pickup 20 will travel across 2100 tracks. This error would be eliminated if the command number of traversed track is corrected in such a manner as to subtract the amount of error from the command number of traversed tracks.

The relationship between the command number of traversed tracks and the track error as shown in FIG. 2 has a dependency on the direction of travel of the optical pickup 20, i.e., whether the optical pickup 20 moves radially outward or inward. The data expressing the relationship, therefore, should be stored for each of the radially outward movement and inward movement of the optical pickup 20. In general, when the optical pickup 20 is activated by an actuator such as the feed motor 30, the load varies depending on the direction of movement of the optical pickup 20 due to mechanical factors such as meshing of a gear train connected to the feed motor 30. As a result that the magnitude of the track error varies according to the direction of travel of the optical pickup 20.

The relationship between the command number of traversed tracks and the track error also depends on other factors such as the type of the disc, e.g., CD or DVD, position of the recording surface in case of a disc having two layers of recording surface, and so on. In the disc playback apparatus 20 of the illustrated embodiment, the data specifying the above-described relationship is obtained for different types of the disc 10. For instance, when the disc 10 is a DVD having two layers of recording surfaces, four patterns of data are collected, combining two directions of movement of the optical pickup 20 and the positions of two layers presenting the recording surfaces.

The learning processing unit 68 process the data acquired from the track error computing unit 66 the data concerning the command number of traversed tracks and the amount of track error. The learning processing unit 68 then stores the results of the processing in the memory 80. The predetermined learning processing performed by the learning processing unit 68 is executed upon each seeking operation, throughout the period from the moment at which a new disc 10 is mounted until the same disc 10 is demounted from the playback apparatus 100.

When the track error as computed by the track error computing unit 66 fails to fall within a given range, the feed speed setting unit 70 sends instructions to the servo controller 38, thereby changing the command value of the speed of movement, i.e., the feed speed, of the optical pickup 20 for the seeking operation. More specifically, in this embodiment, the track error is evaluated to determine if it falls within the given range when the absolute value of the track error is equal to or greater than 10 percent of the command number of the traversed track. For instance, when the command number of traversed track is 10000, the track error is determined as failing to fall within the given range if the track error is not less than +1000 tracks or not more than −1000 tracks. There are three levels V1 to V3 of the command feed speed. The feed speed V1 is rather high, V2 is standard and V3 is rather low. The command feed speed after the change is stored in the memory 80.

The memory 80 stores the values of the feed speed obtained through the learning processing performed by the learning processing unit 68 or set by the feed speed setting unit 70. In the illustrated embodiment, a non-volatile memory such as an EPROM, that can hold the content even after the power supply to the playback apparatus 100 is turned off, is used as the memory 80.

The feed motor 30 and the servo driver 32 in cooperation form an optical pickup moving means. The servo controller 38 and the main controller 60 in combination provide a travel amount commanding means. The RF amplifier 22, the traversed track number computing unit 62 and the track error computing means 66 in cooperation serve as error detecting means. The correction processing unit 64 corresponds to the travel amount correcting means. The memory 80 corresponds to the error data storage means. The learning processing unit 68 corresponds to the error data updating means.

Figure 3:
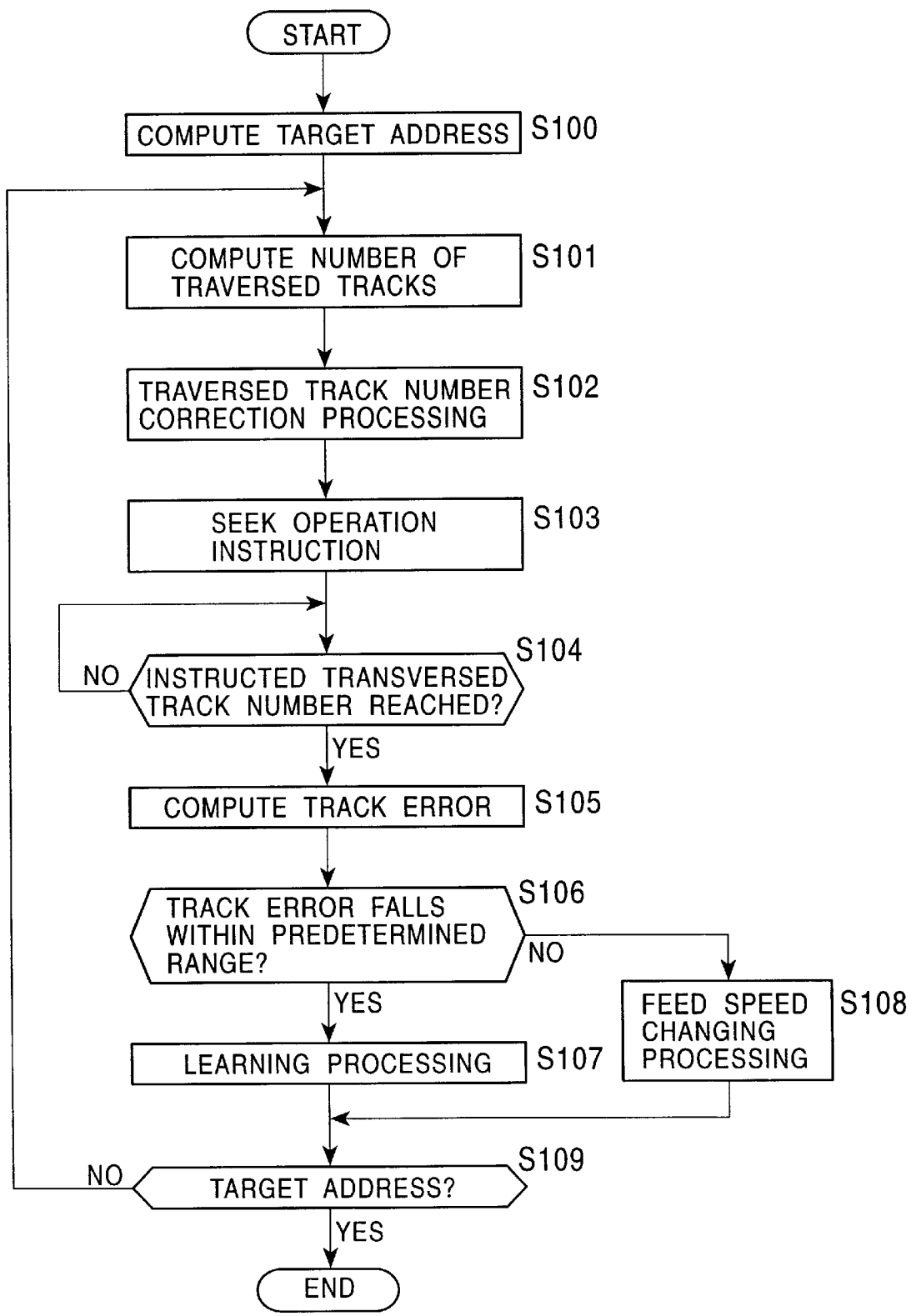
FIG. 3 is a chart showing a seeking operation process performed by one embodiment of the present invention.

FIG. 3 is a chart showing a process of the seeking operation performed by the disc playback apparatus 100. Upon receipt of a read request from the navigation apparatus 200, the main controller 60 computes the address at which the required data is stored, i.e., the target address (act 100).

Subsequently, the traversed track number computing unit 62 computes the absolute track number Ti corresponding to the address of the instant position of the optical pickup 20, as well as the absolute track number Tt corresponding to the target address, and then computes the number of tracks to be traversed (act 101). Then, the correction processing unit 64 performs correction processing on the number of tracks to be traversed determined in act 101.

Figure 4:
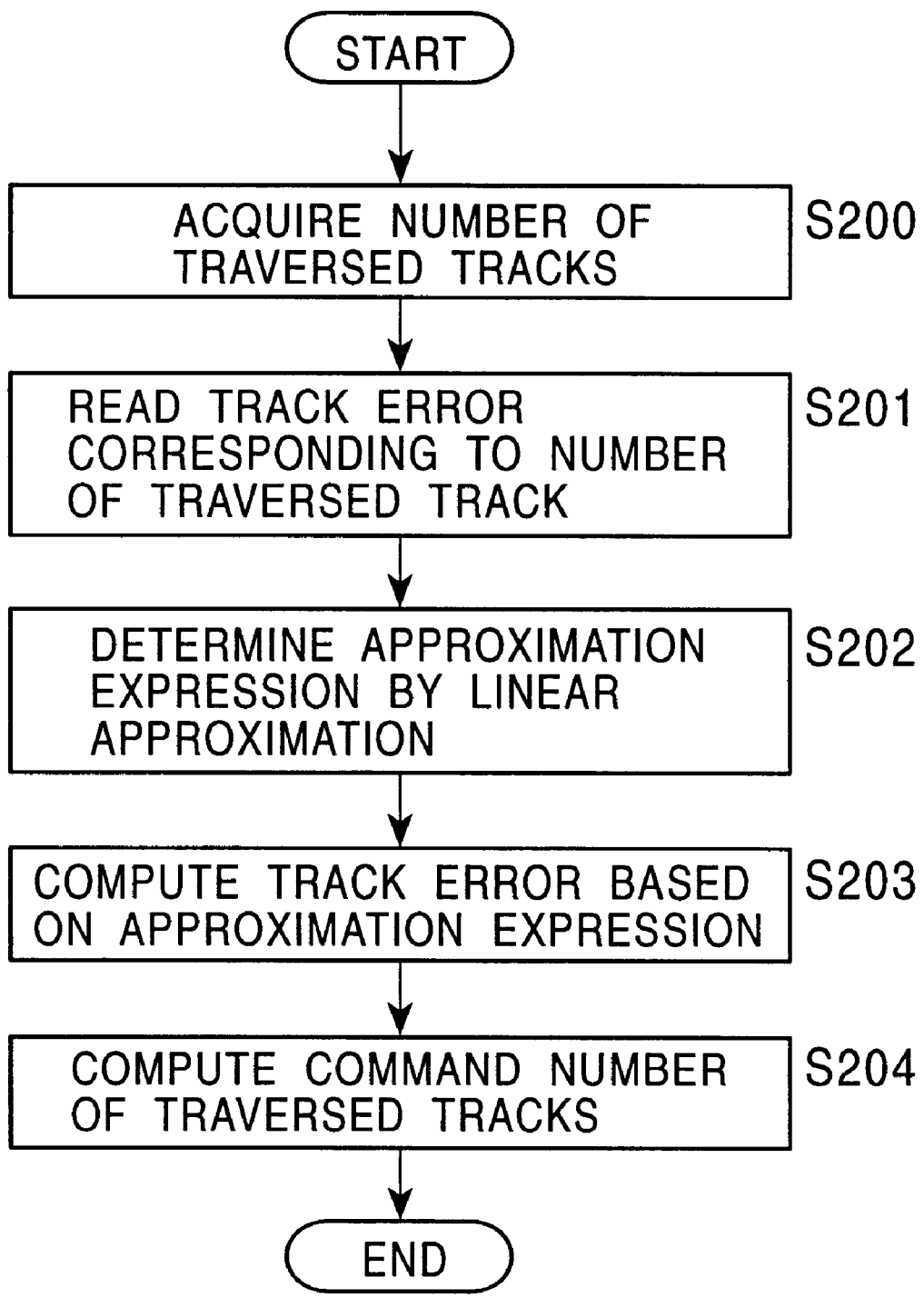
FIG. 4 is a flowchart showing the processing for correcting the number of tracks to be traversed in one embodiment of the present invention.

FIG. 4 is a flowchart showing the detail of the processing performed in act 102 for correcting the number of the tracks to be traversed. The correction processing unit 64 acquires the number of tracks to be traversed as computed by the traversed track number computing unit 62 (act 200), and reads from the memory 80 the value of the track error corresponding to the acquired track number (act 201).

Figure 5:
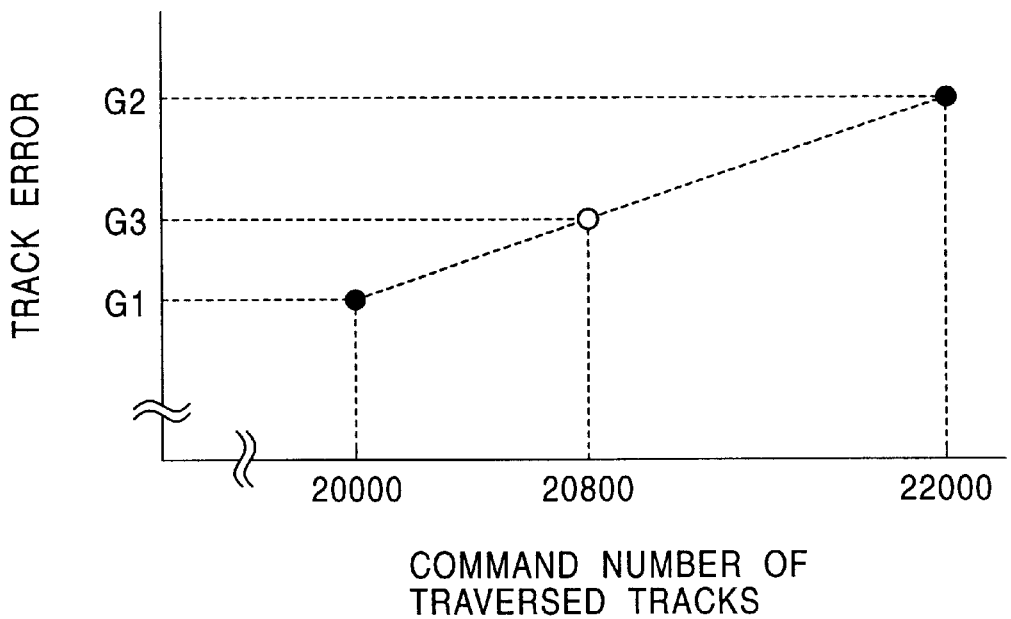
FIG. 5 is an illustration of a method for reading a track error.

FIG. 5 is a diagram illustrative of a practical example of the method for reading the track error. As in the example shown in FIG. 2, in this embodiment, a plurality of ranges of track numbers are set at an increment of 2000 tracks, and the track error value is set for each of the track number ranges of 2000 tracks, 4000 tracks, 6000 tracks and so on. The track number determined in act 101, however, does not always correspond to the above-described regions incremented by 2000 tracks. Therefore, the correction processing unit 64 reads the track error values corresponding to the track number ranges that are just above and below the computed number of tracks to be traversed. More specifically, when the number of the tracks determined is 20800, the correction processing unit 64 reads the track error value G1 corresponding to the track number range of 20000 and the track error value G2 corresponding to the track number range of 22000.

The correction processing unit 64 executes a linear approximation based on the values of track errors as read in act 201 and the values command number of traversed tracks corresponding to these track error values, thus determining an approximation formula that approximates the relationship between the command number of traversed tracks and the track error (act 202).

The correction processing unit 64 then incorporates in the approximation formula the number of tracks to be traversed as determined in act 200, thereby computing the track error value (act 203). In the example shown in FIG. 3, a track error value G3 is determined as the track error value corresponding to the command traversed track number of 20800.

Subsequently, the correction processing unit 64 determines the command number of traversed tracks by subtracting the computed track error value from the number of tracks to be traversed as determined in act 200 (act 204).

Then, the main controller 60 gives seeking operation instructions to the servo controller 38 by supplying the latter with the determined command number of traversed tracks together with information concerning the direction in which the pickup unit is to be moved (act 103).

The servo controller 38 causes the optical pickup 20 to travel, and determines the number of tracks actually traversed by the optical pickup 20 based on the count of the number of pulses that are derived from the RF amplifier 22 which delivers one such pulse each time a track is traversed. Then, a determination is made as to whether the number of the tracks actually traversed has reached the command number of traversed tracks (act 104), and affirmative answer is obtained to terminate the traveling of the optical pickup 20 when the command number of traversed tracks is reached.

Then, the track error computing unit 66 computes the track error (act 105). The feed speed setting unit 70 then determines whether the computed track error falls within a predetermined range (act 106).

When the track error falls within the predetermined range, act 106 provides an affirmative answer, followed by a predetermined learning processing performed by the learning processing unit 68 which updates the relationship between the command number of traversed tracks and the track error.

Figure 6:
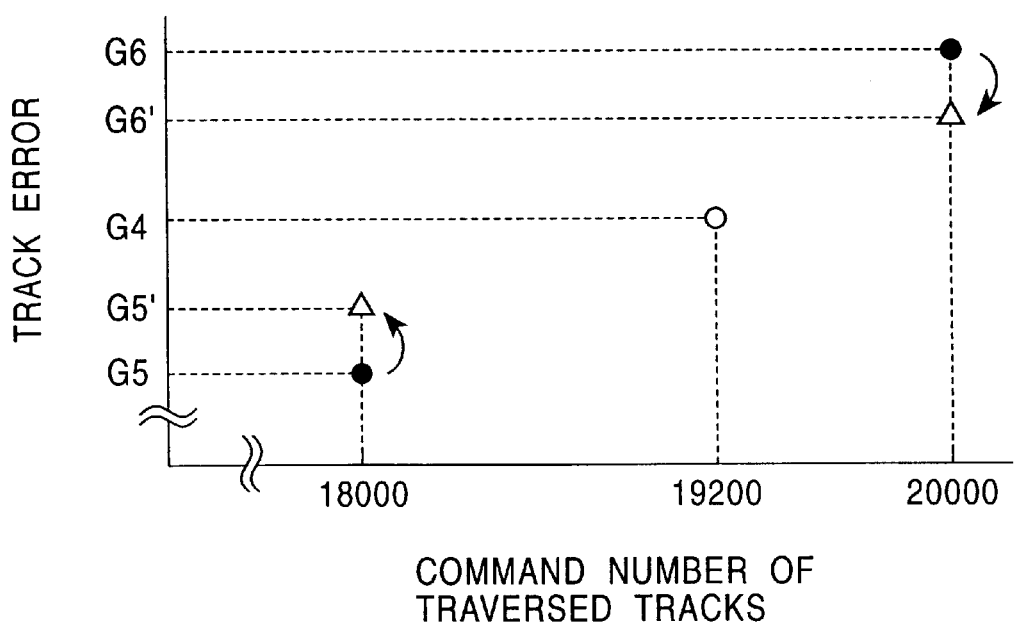
FIG. 6 is an illustration of a practical example of a learning processing executed concerning the relationship between the command number of traversed tracks and the track error.

FIG. 6 is a chart illustrative of a practical example of the learning processing executed in act 107 on the relationship between the command number of traversed tracks and the track error. As described before, in the illustrated embodiment, the track error values are set for the respective ranges of track numbers which are set at increments by 2000 tracks, e.g., 2000 tracks, 4000 tracks, 6000 tracks and so forth. Accordingly, the learning processing unit 68 operates to update the track error values corresponding to two adjacent track number ranges.

By way of example, it is assumed here that the command number of traversed tracks is 19200 tracks, and the track error value corresponding to thus command track number is G4, as shown in FIG. 6. In such a case, the learning processing unit 68 first updates the track error value corresponding to one of the two adjacent ranges of the track number, e.g., the range of 18000 tracks, by changing the old track error value G5 corresponding to the track number range of 18000, based on the track error value G4 presently determined for the command number of traversed tracks. In this updating operation, a weighting processing is conducted in accordance with the cumulative numbers of track error values that have been actually measured. The cumulative number is stored in the memory 80 together with the track error value data. For instance, it is assumed here that the track error G5 has been determined as a result of the last three measurements of the track error values for the track number range of 18000 tracks. In such a case, the new track error value G5' which is to be determined by the newly measured track error value G4 is calculated by computing the following equation:

$$G5'=(G5\times 3+G4)/4$$

Likewise, the learning processing unit 68 determines a new track error value G6' corresponding to the other of the two adjacent track number ranges, i.e., the range of 20000 tracks, by using the existing track error value G6 that has been obtained for this track number range and the track error value G4 which is newly obtained for the command number of traversed tracks of 19200 tracks.

When the track error is too large to fall within the predetermined range, a negative answer is given in act 106, so that the feed speed setting unit 70 executes a processing for changing the feed speed by sending instructions to the servo controller 38 (act 108).

FIG. 7 is a flowchart showing the detail of the feed speed changing processing executed in act 108. The feed speed setting unit 70 acquires the track error computed by the track error computing unit 66 and determines, based on the acquired track error, whether the optical pickup has overreached the target address position (act 300).

If the target address position has been overreached, an affirmative answer is given in act 300, and the feed speed setting unit 70 gives instructions to the servo controller 38 so as to set the feed speed to a value that is one level below the instant speed value (act 301). If the instant feed speed is V3 which is the lowest of the three levels of the feed speed, there is no room for further reduction of the feed speed. In this case, therefore, the instant feed speed value is maintained.

Conversely, if the target address position has not yet been reached by the optical pickup 20, a negative answer is given in act 300, and the feed speed setting unit 70 gives instructions to the servo controller 38 so as to set the feed speed to a value which is one level above the instant speed value (act 302). As in the case of the processing executed in act 301, if the instant feed speed is V1 which is the highest of the three levels of the feed speed, there is no room for further increase of the feed speed. In this case, therefore, the instant feed speed value is maintained.

Upon receipt of the instructions, the servo controller 38 changes the feed speed (act 303). More specifically, the servo controller 38 is equipped with a digital equalizer which is used for the purpose of gain controls and phase compensations for the respective servo systems. The servo controller 38 adjusts the gain of the digital equalizer in accordance with the instructions received from the feed speed setting unit 70, thereby executing processing to increase or decrease the feed speed.

The feed speed setting unit 70 stores the set value of the feed speed (feed speed after the change) in the memory 80 (act 304), thereby completing the series of operation.

Upon completion of the predetermined learning processing executed in act 107 or the feed speed changing processing executed in act 108, the main controller 60 determines whether the address corresponding to the position of the optical pickup 20 after the travel coincides with the target address (act 109). If the coincidence is not achieved, the process returns to act 100, so as to execute once again the series of processings starting from the computation of the number of tracks to be traveled until the target address is reached.

Thus, in the disc playback apparatus 100 of an embodiment of the present invention, the memory 80 stores the relationship between the command numbers of traversed tracks and the track error values. The command number of traversed tracks that commands the number of tracks to be traversed in the seeking operation is computed by effecting, in consideration of the error data stored in the memory, the number of tracks calculated by the traversed track number computing unit 62. Therefore, the position where the signal is read by the optical pickup 20 is allowed to efficiently move to a position near the target address position, thus shortening the seeking time required for the seeking operation. In addition, the disc playback apparatus 100 has a function to execute a predetermined learning processing in which the track error value is computed upon each seeking operation and the content of the error data stored in the memory 80 is updated with the computed error value. This makes it possible to accumulate precise error data that accommodates the individual difference of each of the disc playback apparatuses.

The set feed speed is also subject to change when the track error value fails to fall within the predetermined range. This also permits the feed speed to a value appropriate for each disc playback apparatus, accommodating any individual difference of the product. This effectively serves to suppress the tendency for the seeking operation to become unstable, thus contributing to the shortening the seeking time required for the seeking operation.

The embodiments of the present invention herein described is not restrictive and may be varied and modified in various ways without departing from the spirit of the present invention. For instance, the disc payback apparatus may be implemented as a disc drive that is internally or externally mounted on a personal computer, or a disc playback apparatus that is used in an audio system, although the disc playback apparatus 100 of the described embodiment is coupled with a navigation apparatus 200. In addition, the disc 10 may be any of a CD, a DVD, an MD, and so on.

In the described embodiment, the track error value is determined for each of a plurality of ranges of the track number that are determined at an increment by 2000 tracks. The incremental value of 2000 tracks, however, is only illustrative and any suitable incremental value may be used to set a plurality of ranges of track numbers.

In the embodiment described heretofore, there are three levels of the feed speed settable by the feed speed setting unit 70. This number of the feed speed levels, however, is not exclusive and the invention may employ any number of levels greater than one, i.e., two levels or four or more levels as well.

In the described embodiment, the absolute value of the track error which amounts to 10% of the command number of traversed tracks is used as the critical value for the determination as to whether the processing for changing the feed speed is to be executed. This critical value, however, is only illustrative and different conditions may be used as the threshold for determining whether the feed speed changing control is to be executed.

In the described embodiment, a pulse is output from the RF amplifier 22 each time a track is traversed by the optical pickup 20 during the seeking traveling of the optical pickup 20, and the amount of travel of the optical pickup 20 is determined based on the count of the number of such traverse detection pulses. However, the amount of travel of the optical pickup 20 maybe determined by any other suitable method. For instance, the amount of travel of the optical pickup 20 may be determined through conversion from a number of rotation of a drive gear connected to the shaft of the feed motor 30, detected by means of a photo-pulse sensor. When a pulse motor is used as the feed motor 30, the amount of travel of the optical pickup 20 can be determined through conversion from the number of driving pulses applied to the pulse motor.

In accordance with one embodiment of the present invention, the optical pickup travel amount command given to the optical pickup moving means for the purpose of seeking operation is determined in consideration of an error which is expected to occur when the optical pickup is actually moved. This diminishes the actual value of the travel amount error. It is therefore possible to efficiently move the optical pickup to the position where the information of interest to be read is stored, thus shortening the seeking time required for the seeking operation. In addition, one embodiment of present invention permits the detection of actual travel amount error, as well as correction of the travel amount, for each of the individual types of optical discs that may be used with the disc playback apparatus.

When the detected travel amount error exceeds a predetermined value, the feed speed of the optical pickup is set to a high speed if the optical pickup has not yet reached the reading position corresponding to the travel amount command, and to a low speed if the optical pickup has overreached the reading position. This effectively prevents the seeking operation from becoming unstable, thus contributing to the shortening of the seeking time required for the seeking

What is claimed is:

1. A disc playback apparatus, comprising:

an optical pickup for optically reading information stored in an optical disc;

an optical pickup moving means for causing said optical pickup to travel in a radial direction of said optical disc;

a travel amount commanding means for providing a travel amount command to said optical pickup moving means;

an error detecting means for detecting a travel amount error, said travel amount error comprising the difference between an amount of travel indicated in said travel amount command and an amount of actual travel by said optical pickup;

a travel amount correcting means for correcting the value of the travel amount command so as to reduce said travel amount error; and an error data storage means for storing the values of said travel amount error in relation to the values of said travel amount command.

2. A disc playback apparatus, comprising:

an optical pickup for optically reading information stored in an optical disc;

an optical pickup moving means for causing said optical pickup to travel in a radial direction of said optical disc;

a travel amount commanding means for providing a travel amount command to said optical pickup moving means;

an error detecting means for detecting a travel amount error, said travel amount error comprising the difference between an amount of travel indicated in said travel amount command and an amount of actual travel by said optical pickup; and a travel amount correcting means for correcting the value of the travel amount command so as to reduce said travel amount error;

wherein said travel amount command is stored in memory and is dependant on the type of optical disc provided to the disc playback apparatus.

3. The disc playback apparatus of claim 2, wherein said error data storage means comprises a non-volatile memory.

4. A disc playback apparatus according to claim 2, wherein said error data storage means stores the travel amount error in association with the direction of travel of said optical pickup caused by said optical pickup moving means, and wherein said travel amount correcting means performs the correction based on both the direction of travel and the travel amount error.

5. The disc playback apparatus of claim 2 wherein said error data storage means stores the travel amount error with respect to the position of a layer of a signal recording surface of an optical disc with a plurality of layers and wherein said travel amount correcting means performs a correction based on both the position of the layer and the travel amount error.

6. The disc playback apparatus of claim 2, further comprising error data updating means for successively updating, in parallel with an operation for reproducing information read through said optical pickup, the content of said error data storage means based on the results of the detection performed by said error detecting means.

7. The disc playback apparatus of claim 1, wherein said optical pickup moves radially along said optical disc with a travel speed and further comprising a travel speed setting means operable to adjust said travel speed.

8. The disc playback apparatus of claim 7 wherein said travel speed setting means increases said travel speed when said travel amount error exceeds a predetermined value and said amount of actual travel is less than said amount of travel indicated in said travel amount command.

9. The disc playback apparatus of claim 7 wherein said travel speed setting means decreases said travel speed when said travel amount error exceeds a predetermined value and said amount of actual travel is greater than said amount of travel indicated in said travel amount command.

10. A disc playback apparatus, comprising:

an optical pickup for optically reading information stored in an optical disc;

an optical pickup moving means for causing said optical pickup to travel in a radial direction of said optical disc with a travel speed;

a travel amount commanding means for providing a travel amount command to said optical pickup moving means;

an error detecting means for detecting a travel amount error, said travel amount error comprising the difference between an amount of travel indicated in said travel amount command and an amount of actual travel by said optical pickup; and a travel speed setting means operable to alter said travel speed when said travel amount error exceeds a predetermined value;

wherein said travel speed setting means increases said travel speed when said amount of actual travel is less than said amount of travel indicated in said travel amount command.

11. The disc playback apparatus of claim 10 wherein said travel speed setting means decreases said travel speed when said amount of actual travel is more than said amount of travel indicated in said travel amount command.

12. A disc playback apparatus according to claim 10, further comprising:

an error data storage means for storing, in relation to the direction of travel of said optical pickup caused by said optical pickup moving means, the travel amount error detected by said error detecting means; and a travel amount correcting means for performing the correction based on both the direction of travel and the travel amount error.

13. A disc playback apparatus according to claim 12, further comprising an error data updating means for successively updating the content of said error data storage means based on the results of the detection performed by said error detecting means.

14. A disc playback apparatus according to claim 10, wherein said optical disc has a plurality of layers providing signal recording surfaces, said disc playback apparatus further comprising:

an error data storage means for storing, in association with the position of the layer of a signal recording surface, the travel amount error detected by said error detecting means, and a travel amount correcting means for performing the correction based on both the position of the layer and the travel amount error.

15. A seeking method for a disc playback apparatus having an optical pickup for optically reading information stored in an optical disc, said method comprising the acts of:

computing a travel amount command that represents the amount to be traveled by said optical pickup in a radial direction of the optical disc;

detecting a travel amount error, said travel amount error comprising the difference between an amount of travel indicated in said travel amount command and an amount of actual travel by said optical pickup;

correcting the value of the travel amount command so as to reduce said travel amount error; and storing the detected values of said travel amount error in relation to the values of said travel amount command that are set at a predetermined pitch.

16. A seeking method according to claim 15, wherein said travel amount error is stored in association with the direction of travel of said optical pickup and wherein the correction of the value of the travel amount command is performed based on both the direction of travel and the travel amount error.

17. A seeking method according to claim 15, wherein said optical disc has a plurality of layers providing signal recording surfaces, wherein the storage of the travel amount error is conducted in association with the position of the layer of a signal recording surface, and wherein the correction of the travel amount command is performed based on both the position of the layer and the travel amount error.

18. A seeking method for a disc playback apparatus having an optical pickup for optically reading information stored in a optical disc; said method comprising the acts of:

computing a travel amount command that represents the amount to be traveled by said optical pickup in a radial direction of the optical disc;

detecting a travel amount error, said travel amount error comprising the difference between an amount of travel indicated in said travel amount command and an amount of actual travel by said optical pickup;

storing said detected travel amount error in a memory;

correcting the value of the travel amount command so as to reduce said travel amount error; and successively updating the content of said memory based on the travel amount error detection results.

19. A seeking method according to claim 18, wherein, when the travel amount error exceeds a predetermined value, the travel speed of said optical pickup is set to a high speed if the position of the optical pickup after a travel is still short of a reading position corresponding to the travel amount command and to a low speed if the position of the optical pickup has overreached the reading position.

20. A seeking method for a disc playback apparatus having an optical pickup for optically reading information stored in a disc-type storage medium; said method comprising the acts of:

determining an amount to be traveled by said optical pickup in a radial direction of the disc-type storage device;

detecting a travel amount error in terms of the difference between the amount to be traveled and an amount actually traveled by said optical pickup in accordance with said travel amount command; and setting, when the travel amount error exceeds a predetermined value, the travel speed of said optical pickup to a high speed if the position of the optical pickup after a travel is still short of a reading position corresponding to the travel amount command, and to a low speed if the position of the optical pickup has overreached the reading position.

21. The seeking method of claim 20 further comprising the act of storing the detected travel amount error in a memory.

22. The seeking method of claim 21 further comprising the act of updating, when the travel amount error is smaller than said predetermined value, the relationship stored in said memory between said travel amount command and said travel amount error, based on the detected travel amount error.

23. A controller for a disc playback apparatus, comprising:

a memory operable to store a travel amount error;

a traversed track number computing unit operable to compute a number of tracks to be traversed by an optical pickup;

a correction processing unit in communication with said traversed track number processing unit and said memory, said correction processing unit operable to provide a corrected amount of tracks to be traversed;

a track error computing unit in communication with said correction processing unit and operable to detect a travel amount error, said travel amount error comprising the difference between said corrected amount of tracks to be traversed and an amount of tracks actually traversed by said optical pickup; and a learning process unit in communication with said track error computing unit and said memory, said learning process unit operable to store data received from said track error computing unit in said memory.

24. The controller of claim 23 further comprising a feed speed setting unit in communication with track error computing unit and said learning processing unit, said feed speed setting unit operable to provide a feed speed signal in response to said travel amount error, said corrected amount of tracks to be traversed, and an amount of tracks actually traversed by said optical pickup.

* * * * *

UNITED STATES PATENT AND TRADEMARK OFFICE
CERTIFICATE OF CORRECTION

PATENT NO. : 6,724,695 B2
DATED : April 20, 2004
INVENTOR(S) : Yusuke Kumagami et al.

It is certified that error appears in the above-identified patent and that said Letters Patent is hereby corrected as shown below:

Title page,
Item [54], Title, delete "METHOD FOR ACCESSING OPTICAL DISK BY DETECTING THE DIFFERENT BETWEEN MOVING COMMAND AND ACTUALLY MOVING" and substitute -- METHOD AND APPARATUS FOR ACCESSING AN OPTICAL DISK UTILIZING THE DIFFERENCE BETWEEN MOVEMENT COMMAND AND ACTUAL MOVEMENT -- in its place.

Signed and Sealed this

Twenty-second Day of March, 2005

JON W. DUDAS
*Director of the United States Patent and Trademark Office*